United States Patent
Kappich

(10) Patent No.: US 10,682,898 B2
(45) Date of Patent: Jun. 16, 2020

(54) COMPRESSOR AND A MOUNTING APPARATUS FOR MOUNTING THE COMPRESSOR

(71) Applicant: Dr. Ing. h.c. F. Porsche Aktiengesellschaft, Stuttgart (DE)

(72) Inventor: Joachim Kappich, Weil der Stadt (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 21 days.

(21) Appl. No.: 16/106,257

(22) Filed: Aug. 21, 2018

(65) Prior Publication Data
US 2019/0061474 A1 Feb. 28, 2019

(30) Foreign Application Priority Data
Aug. 22, 2017 (DE) ........................ 10 2017 119 138

(51) Int. Cl.
*B60H 1/32* (2006.01)
*F04B 39/12* (2006.01)
*B60K 25/00* (2006.01)
*F04C 21/00* (2006.01)
*F04B 39/14* (2006.01)
*F01C 21/00* (2006.01)
*B60H 1/00* (2006.01)

(52) U.S. Cl.
CPC ....... *B60H 1/3229* (2013.01); *B60H 1/00535* (2013.01); *B60K 25/00* (2013.01); *F01C 21/007* (2013.01); *F04B 39/12* (2013.01); *F04B 39/14* (2013.01); *F04C 21/007* (2013.01)

(58) Field of Classification Search
USPC ........................................ 248/659
See application file for complete search history.

(56) References Cited

U.S. PATENT DOCUMENTS

| | | | |
|---|---|---|---|
| 1,971,417 A | 8/1934 | Kingston et al. | |
| 2,575,858 A | 11/1951 | Bennett | |
| 4,263,964 A * | 4/1981 | Masai | F28D 9/00 122/510 |
| 4,676,473 A * | 6/1987 | Giles | F16F 15/08 248/316.6 |
| 5,491,983 A * | 2/1996 | Hamilton | B60H 1/00571 137/577 |
| 5,810,322 A | 9/1998 | Zhao et al. | |
| 5,873,560 A * | 2/1999 | Serdar, Jr. | B60K 6/30 248/562 |
| 6,132,183 A | 10/2000 | Li et al. | |

(Continued)

FOREIGN PATENT DOCUMENTS

DE 69926200 T2 3/2006
WO 2012114438 A1 8/2012

OTHER PUBLICATIONS

German Search Report for German Application No. 10 2017 119 138.0, dated May 23, 2018, with partial translation—5 pages.

(Continued)

*Primary Examiner* — Monica E Millner
(74) *Attorney, Agent, or Firm* — RatnerPrestia

(57) ABSTRACT

A system includes a compressor and a mounting apparatus for mounting the compressor. The compressor is held exclusively by way of the mounting apparatus. The mounting apparatus includes two pendulum-type bearings and a hinged support.

14 Claims, 1 Drawing Sheet

(56) References Cited

U.S. PATENT DOCUMENTS

| | | | | |
|---|---|---|---|---|
| 6,234,445 | B1* | 5/2001 | Yoon | B60R 11/00 |
| | | | | 248/638 |
| 6,352,247 | B1* | 3/2002 | Ishikawa | F01C 21/007 |
| | | | | 248/638 |
| 6,378,832 | B1* | 4/2002 | Li | F16F 1/3849 |
| | | | | 248/635 |
| 6,543,741 | B1 | 4/2003 | Li et al. | |
| 7,588,117 | B2* | 9/2009 | Fukuda | B60K 1/00 |
| | | | | 180/291 |
| 7,819,638 | B2* | 10/2010 | Grimm | B60H 1/00507 |
| | | | | 248/603 |
| 8,596,403 | B2* | 12/2013 | Cunningham | B60K 1/00 |
| | | | | 180/291 |
| 9,139,070 | B2 | 9/2015 | Mochizuki | |
| 2003/0230443 | A1* | 12/2003 | Cramer | B60G 3/20 |
| | | | | 180/65.51 |
| 2013/0305761 | A1* | 11/2013 | Mochizuki | B60H 1/3229 |
| | | | | 62/239 |
| 2015/0107920 | A1* | 4/2015 | Sakamoto | B60K 1/00 |
| | | | | 180/65.31 |
| 2017/0037928 | A1* | 2/2017 | Kronkright | F16F 7/01 |
| 2017/0259645 | A1* | 9/2017 | Connell | B60H 1/00428 |

OTHER PUBLICATIONS

Great Britain Search Report for Great Britain Application No. 1813575.6, dated Jan. 30, 2019, 2 pages.

Notice of Reasons for Refusal for Japanese Application No. 2018-154041, dated Jul. 24, 2019, with translation, 7 pages.

English Translation of the Korean Office Action for Korean Application No. 10-2018-0095966, dated Sep. 11, 2019, 3 pages.

Chinese Office Action for Chinese Application No. 201810941128.6, dated Sep. 19, 2019, 6 pages.

* cited by examiner

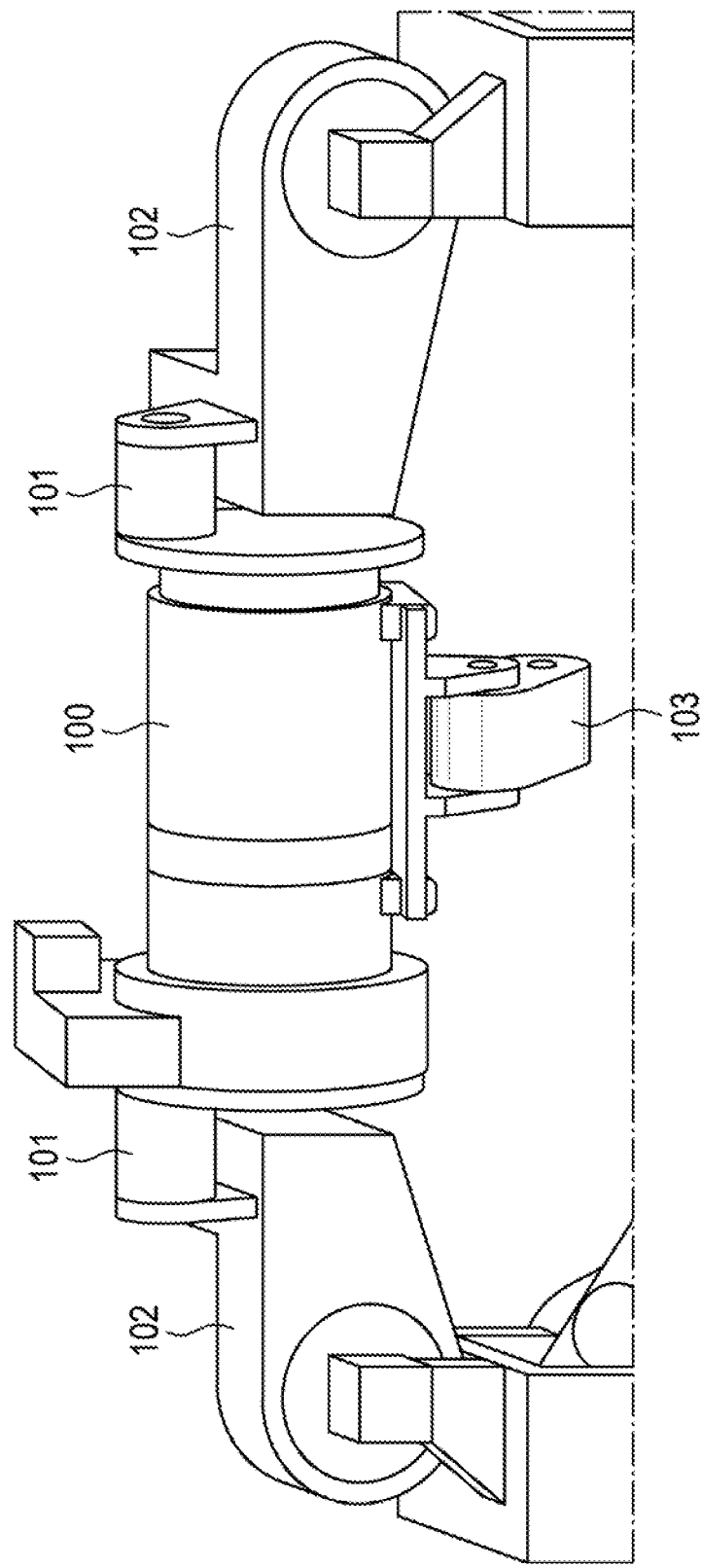

COMPRESSOR AND A MOUNTING APPARATUS FOR MOUNTING THE COMPRESSOR

CROSS-REFERENCE TO RELATED APPLICATION

This application claims priority to German Patent Application No. DE 10 2017 119 138.0, filed Aug. 22, 2017, which is incorporated by reference herein in its entirety.

FIELD OF THE INVENTION

The present invention relates to a system having a compressor for a vehicle and a mounting apparatus for the compressor.

BACKGROUND OF THE INVENTION

Compressors and mounting apparatuses therefor are known from the prior art. It is frequently desirable to as far as possible not transmit vibrations of the compressor via the mounting to other components of the system. What are known as pendulum-type bearing systems in the prior art are used for this purpose. U.S. Pat. No. 5,810,322 A1, which is incorporated by reference herein, discloses a compressor having a pendulum-type bearing system of this type.

SUMMARY OF THE INVENTION

Described herein is a system that provides stable mounting of a compressor with satisfactory mechanical insulation with respect to vibrations. Moreover, a motor vehicle having a mounting of this type is to be provided.

The system described herein comprises a compressor and a mounting apparatus for mounting the compressor. The compressor is held exclusively by way of the mounting apparatus. The mounting apparatus comprises two pendulum-type bearings and a hinged support. Here, a pendulum-type bearing is, understood to mean, in particular, a pendulum-type ball bearing within the context of this description. The pendulum-type bearing defines a swing axis of the compressor, about which it can swing. The hinged support likewise permits said swing movement and, moreover, counteracts a part of the weight of the compressor.

In accordance with one embodiment of the invention, the mounting apparatus can consist of the two pendulum-type bearings and the hinged support. This can mean, in particular, that the mounting apparatus does not comprise any further components. This is then a mounting apparatus which is particularly simple to assemble.

In accordance with one embodiment of the invention, the compressor can be arranged between the two pendulum-type bearings. The two pendulum-type bearings are preferably aligned with one another, with the result that they together define the swing axis of the compressor.

In accordance with one embodiment of the invention, the two pendulum-type bearings can lie opposite one another. This is advantageous, in particular, if the compressor is arranged between the two pendulum-type bearings.

In accordance with one embodiment of the invention, the hinged support can be arranged below the compressor. In this way, the hinged support can particularly satisfactorily counteract the weight of the compressor.

In accordance with one embodiment of the invention, the two pendulum-type bearings can be arranged on different sides of the compressor than the hinged support. The pendulum-type bearings can be arranged laterally, for example, and the hinged support can be arranged below the compressor.

In accordance with one embodiment of the invention, the system can comprise an electric drive for a motor vehicle and at least one carrying arm. The electric drive is held by way of the carrying arm. The pendulum-type bearings are fastened to the carrying arm. It is also possible that the system comprises two carrying arms, to which the electric drive is fastened. In this case, in each case one of the pendulum-type bearings can be fastened to one of the carrying arms.

In accordance with one embodiment of the invention, the carrying arm can have a geometrical longitudinal axis. Here, within the context of this description, the geometrical longitudinal axis is understood to mean, in particular, the notional axis, along which the carrying arm has its greatest extent. The longitudinal axis of the carrying arm can run, in particular, in the transverse direction of the motor vehicle. The two pendulum-type bearings are both arranged on a single geometrical axis which is identical to the longitudinal axis of the carrying arm or is parallel to it. Here, within the context of this description, the geometrical axis, on which the pendulum-type bearings are arranged, is understood to mean, in particular, a notional straight line.

In accordance with one embodiment of the invention, the compressor can be configured as a compressor for a climate control device for a motor vehicle (e.g., an air conditioning compressor). Here, within the context of this description, a climate control device is understood to mean, in particular, a device which is configured to cool air and to feed the cooled air into a vehicle interior compartment of the motor vehicle.

Further features and advantages of the present invention will become clear using the following description of one preferred exemplary embodiment with reference to the appended FIGURE, in which:

BRIEF DESCRIPTION OF THE DRAWING FIGURES

The FIGURE shows a diagrammatic perspective illustration of a system in accordance with one embodiment of the invention.

DETAILED DESCRIPTION OF THE INVENTION

The system comprises a compressor 100, two pendulum-type bearings 101, two carrying arms 102 and a hinged support 103. The compressor 100 is held by way of the two pendulum-type bearings 101 and the hinged support 103. The compressor 100 is arranged between the two pendulum-type bearings 101 and is supported from below by way of the hinged support 103. It can swing about the swing axis which is defined by way of the pendulum-type bearings 101, with the result that there is satisfactory mechanical insulation with respect to vibrations which occur.

The pendulum-type bearings 101 are fastened to the carrying arms 102. Moreover, the carrying arms 102 support an electric drive of the motor vehicle, in which the system is arranged. The carrying arms 102 therefore have a dual function, with the result that the assembly of the system is particularly simple, since the pendulum-type bearings 101 can be fastened to the carrying arms 102 which are already present in the motor vehicle.

The hinged support 103 comprises a fastening element of plate-like configuration and a swing element which is fastened pivotably thereto.

What is claimed is:

1. A system comprising a compressor and a mounting apparatus for pivotably mounting the compressor on a motor vehicle, the compressor being held exclusively by way of the mounting apparatus, wherein the mounting apparatus comprises two pendulum bearings and a hinged support, each pendulum bearing configured to permit pivoting motion of the compressor with respect to the motor vehicle, each pendulum bearing having an axis of rotation that is spaced apart from a longitudinal axis of the compressor, the hinged support being positioned at an elevation beneath the compressor for at least partially supporting a weight of the compressor while also permitting pivoting motion of the compressor with respect to the motor vehicle, and wherein an axis of rotation of the pendulum bearings is spaced apart from an axis of rotation of the hinged support.

2. The system as claimed in claim 1, wherein the compressor is arranged between the two pendulum bearings.

3. The system as claimed in claim 1, wherein the two pendulum bearings lie opposite one another with respect to the compressor.

4. The system as claimed in claim 1, wherein the two pendulum bearings are arranged on a different side of the compressor than the hinged support.

5. The system as claimed in claim 1, wherein the system comprises at least one carrying arm, and the pendulum bearings being fastened to the carrying arm.

6. The system as claimed in claim 5, wherein the carrying arm has a geometrical longitudinal axis, the pendulum bearings both being arranged on a single geometrical axis which is either co-aligned with the longitudinal axis of the carrying arm or is parallel to the longitudinal axis of the carrying arm.

7. The system as claimed in claim 1, wherein the compressor is configured as a compressor for a climate control device for the motor vehicle.

8. A motor vehicle comprising the system as claimed in claim 1.

9. The system as claimed in claim 1, wherein the pendulum bearings are positioned on opposite sides of the compressor, and the hinged support is located at an elevation beneath the pendulum bearings.

10. The system as claimed in claim 1, wherein the compressor includes a cylindrical body, the pendulum bearings are positioned on opposing ends of the cylindrical body, and the hinged support is located at an elevation beneath a substantially cylindrical surface of the cylindrical body.

11. The system as claimed in claim 1, wherein the pendulum bearings are not directly connected to the hinged support.

12. The system as claimed in claim 1, wherein the hinged support and the pendulum bearings are mounted at different locations on the compressor.

13. The system as claimed in claim 1, wherein the hinged support is fixed to a plate that is mounted to a bottom side of the compressor.

14. The system as claimed in claim 1 further comprising carrying arms to which the compressor is mounted, wherein each pendulum bearing are mounted above one of the carrying arms.

* * * * *